United States Patent
Lo et al.

(10) Patent No.: US 10,748,018 B2
(45) Date of Patent: Aug. 18, 2020

(54) MULTI-STAGE TATTOO MATCHING TECHNIQUES

(71) Applicant: MorphoTrak, LLC, Anaheim, CA (US)

(72) Inventors: Peter Zhen-Ping Lo, Mission Viejo, CA (US); Hui Zhu, Anaheim, CA (US)

(73) Assignee: MorphoTrak, LLC, Anaheim, CA (US)

( * ) Notice: Subject to any disclaimer, the term of this patent is extended or adjusted under 35 U.S.C. 154(b) by 161 days.

(21) Appl. No.: 16/118,565

(22) Filed: Aug. 31, 2018

(65) Prior Publication Data

US 2018/0373946 A1  Dec. 27, 2018

Related U.S. Application Data

(63) Continuation of application No. 15/395,113, filed on Dec. 30, 2016, now Pat. No. 10,095,938.

(51) Int. Cl.
  *G06K 9/00* (2006.01)
  *G06K 9/46* (2006.01)
  *G06T 7/33* (2017.01)
  *G06T 5/00* (2006.01)

(52) U.S. Cl.
  CPC ..... *G06K 9/00892* (2013.01); *G06K 9/00624* (2013.01); *G06K 9/4671* (2013.01); *G06T 5/003* (2013.01); *G06T 7/33* (2017.01); *G06T 2207/10004* (2013.01); *G06T 2207/10024* (2013.01); *G06T 2207/30196* (2013.01)

(58) Field of Classification Search
  None
  See application file for complete search history.

(56) References Cited

U.S. PATENT DOCUMENTS

| 6,259,818 | B1 | 7/2001 | Kim |
| 2005/0264554 | A1 | 12/2005 | Deming |
| 2007/0286493 | A1 | 12/2007 | Liu |
| 2013/0177216 | A1 | 7/2013 | Shuster |

(Continued)

FOREIGN PATENT DOCUMENTS

EP  1852806  11/2007

OTHER PUBLICATIONS

A brief history of tattoos. <http://www.designboom.com/history/tattoo_history.html> 6 pages.

(Continued)

*Primary Examiner* — Mark Roz
(74) *Attorney, Agent, or Firm* — Fish & Richardson P.C.

(57) ABSTRACT

In some implementations, systems and techniques are capable of performing a multi-stage tattoo matching operation to improve matching accuracy for various tattoo images—namely small tattoo images, distorted tattoo images, low-quality tattoo images. The multi-stage tattoo matching operation described throughout includes two matching stages that compare a search tattoo image against a set of reference tattoo images. In the first matching stage, the system can use scale invariant feature transform (SIFT) descriptors, or other similar types of local descriptors, to identify a list of best-matched reference tattoo images from among the set of reference tattoo images. In the second matching stage, the system uses enhanced tattoo matching techniques to verify the non-matched points and determine whether their associated areas are matched or not.

20 Claims, 4 Drawing Sheets

(56) References Cited

U.S. PATENT DOCUMENTS

2016/0307057 A1  10/2016  Li
2019/0012561 A1  1/2019  Hougen

OTHER PUBLICATIONS

Acton and Rossi, "Matching and Retrieval of Tattoo Images: Active Contour Cbir and Glocal Image Features," In Proc. IEEE SSIAI, 2008, 21-24.

Bernal et al., "Fast Dynamic Programming for Elastic Registration of Curves," 2016 IEEE Conference on Computer Vision and Pattern Recognition Workshops, 2016, 1066-1073.

Buchin et al., "Exact Algorithms for Partial Curve Matching via the Frechet Distance," Proceedings of the twentieth annual ACM-SIAM symposium on Discrete algorithms, 2009, 645-654.

Cardoze and Schulman, "Pattern Matching for Spatial Point Sets," in Proc. 39th IEEE Foundations of Computer Science, 1988, pp. 156-165.

Cohen and Guibas, "Partial Matching of Planar Polylines Under Similarity Transformations," The eighth Annual ACM-SIAM Symposium on Discrete Algorithms, Jan. 1997, 777-786.

Cui et al., "Curve matching for open 2D curves," Pattern Recognition Letters, Jan. 2009, 30: 1-10.

Dijkstra, "A Note on Two Problems in Connexion with Graphs," Numerische Mathematik, 1959, 1: 269-271.

Efrat et al., "Curve Matching, Time Warping, and Light Fields: New Algorithms for Computing Similarity between Curves," J Math Imaging Vis, 2007, 27: 203-216.

Felzenszwalb and Zabih, "Dynamic Programming and Graph Algorithms in Computer Vision," Ieee Machine Transactions on Pattern Analysis and Intelligence, Apr. 2011, 33: 721-740.

Han and Jain, "Tattoo Based Identification: Sketch to Image Matching," In Proc. of the 6th IAPR International Conference on Biometrics (ICB), Jun. 4-7, 2013, 8 pages.

Heflin et al., "Detecting and Classifying Scars, Marks, and Tattoos Found in the Wild," In Proc. BTAS, 2012, 31-38.

Jain et al., "Tattoo-ID: Automatic Tattoo Image Retrieval for Suspect & Victim Identification," In Proc. IEEE PCM, 2007, 256-265.

Jurie and Schmid, "Scale-invariant shape features for recognition of object categories," Proceedings of the 2004 IEEE Computer Society Conference on Computer Vision and Pattern Recognition, 2004, 7 pages.

Kitti et al., "An Object Recognition and Identification System Using the Harris Corner Detection Method," International Journal of Machine Learning and Computing, Aug. 2012, 2: 462-465.

Lee et al., "Image Retrieval in Forensics: Tattoo Image Database Application," IEEE MultiMedia ,2012, 19: 40-49.

Lee et al., "Unsupervised Ensemble Ranking. Application to Large-Scale Image Retrieval," In Proc. ICPR, 2010, 3902-3906.

Lowe, "Distinctive Image Features from Scale-Invariant Keypoints," International Journal of Computer Vision, 2004, 60(2): 91-110.

Ngan et al., "Tattoo Recognition Technology—Challenge (Tatt-C) Outcomes and Recommendations," NISTIR 8078, 2015.

Sivac and Zisserman, Video Google: A Text Retrieval Approach to Object Matching in Videos, In ICCV, 2003, 1-8.

Tsitsiklis, "Efficient Algorithms for Globally Optimal Trajectories," IEEE Transactions on Automatic Control, Sep. 1995, 40: 1528-1538.

Zhang, "Iterative Point Matching for Registration of Free-Form Curves and Surfaces," International Journal of Computer Vision, 1994, 13:2, 119-152.

MULTI-STAGE TATTOO MATCHING TECHNIQUES

CROSS-REFERENCE TO RELATED APPLICATIONS

This application claims priority to U.S. application Ser. No. 15/395,113, filed Dec. 30, 2016, which is incorporated by reference in its entirety.

FIELD

The present specification relates generally to tattoo matching systems.

BACKGROUND

Automatic biometric identification systems are commonly used in many contexts to efficiently identify and verify the identity of individuals. For instance, automatic tattoo systems often make such identification or verification based on distinctive characteristics of tattoos present on a target's skin. In such systems, color or grayscale characteristics are extracted from an image that includes a tattoo and compared to a set of previously collected reference tattoo images.

SUMMARY

Traditional tattoo image matching systems often identify near-identical or similar tattoo images based on comparing local descriptors of distinctive feature points within two tattoo images. For instance, local descriptors of feature points within a search tattoo image are compared against local descriptors of feature points within a reference tattoo image. A reference tattoo image may be determined to be a near-identical or similar image if a certain number of feature points are determined to be "mated" (representing corresponding feature points within the two images based on a comparison of their respective local descriptors).

However, while these systems exhibit adequate matching performance for two near-identical or similar tattoo images, such systems are often incapable of matching various types of tattoo images. For example, when the size of a reference tattoo image exceeds the size of a search tattoo image, attributes from the excess regions of the reference tattoo image that are not associated with a tattoo may distort match detection results (e.g., the presence of an in-grown hair in the reference tattoo image). In other examples, if the search tattoo image is small, or if the tattoo within the search tattoo image is small, then a limited number of feature points that are associated with the tattoo are available for use in a matching operation. In addition, if the search tattoo image exhibits distortions or low image quality (e.g., low contrast, blur) due to image capture errors, matching performance of traditional tattoo recognition systems is further reduced.

Accordingly, one innovative aspect described throughout this specification includes systems and techniques capable of performing a multi-stage tattoo matching operation to improve matching accuracy for various tattoo images—namely small tattoo images, distorted tattoo images, low-quality tattoo images. The multi-stage tattoo matching operation described throughout includes two matching stages that compare a search tattoo image against a set of reference tattoo images.

In the first matching stage, the system can use scale invariant feature transform (SIFT) descriptors, or other similar types of local descriptors, to identify a list of best-matched reference tattoo images from among the set of reference tattoo images. The system also identifies the mated reference feature points within each reference tattoo image. In the second matching stage, the system uses enhanced tattoo matching techniques to verify the non-matched points and determine whether their associated areas are matched or not. Therefore, using the multi-stage tattoo matching techniques, the system is capable of improving the accuracy of a matching operation relative to traditional tattoo matching techniques.

Implementations may include one or more of the following features. For example, a computer-implemented method may include a set of operations. The operations may include operations that include obtaining a search template associated with a search tattoo image, the search template comprising (i) the search tattoo image, (i) a plurality of search feature points, (iii) a search local descriptor for each search feature point within the plurality of search feature points.

The method also includes obtaining a reference template associated with a reference tattoo image that has previously been compared to the search template, the reference template comprising (i) a plurality of reference feature points, (ii) a reference local descriptor for each reference feature point, and (iii) a group of mated feature point pairs that each includes a reference feature point from among the plurality of reference feature points and corresponding matching search feature point.

The method also includes determining a mated region within the reference template based at least on respective locations of the reference feature points of the group of mated feature point pairs within the reference template.

The method also includes computing a plurality of transformation parameters based on (i) the search feature points of the group of mated feature point pairs that are located within the mated region of the search template and (ii) the reference feature points of the group of mated feature point pairs that are located within the mated region of the reference template.

The method also includes remapping, using the plurality of transformation parameters, the reference feature points within the mated region of the reference template onto the search tattoo image to generate a set of remapped search feature points.

The method also includes generating a respective remapped search local descriptor for each search feature point included within the set of remapped search feature points and comparing each of the remapped search local descriptors to reference local descriptors of reference feature points that (i) are not included in the group of mated feature point pairs and (ii) are located within the mated region of the reference template. The method finally includes computing a match score between the search tattoo image and the reference tattoo image based at least on comparing each of the remapped search local descriptors to the reference local descriptors of the reference feature points.

Other versions include corresponding systems, and computer programs, configured to perform the actions of the methods encoded on computer storage devices.

One or more implementations may include the following optional features. For example, in some implementations, the method further includes identifying a group of the mated reference local descriptors that includes reference local descriptors of reference feature points that match the search local descriptors of the remapped search feature points within the search tattoo image based on comparing each of the remapped search local descriptors to the reference local descriptors of the reference feature points.

In some implementations, the match score between the search tattoo image and the reference tattoo image is based on at least on one or more of: a number of reference feature points included in the group of mated reference local descriptors, a ratio between a number of reference feature points included in the group of mated reference local descriptors and a number of feature points within a mated region of the search template, a ratio between a number of reference feature points included in the group of mated reference local descriptors and a number of remapped search feature points that correspond to a reference feature point within the mated region of the reference template, a ratio between a number of reference feature points included in the group of mated reference local descriptors and a number of remapped search feature points that correspond to a search feature point within a mated region of the search template, or one or more quality metrics associated with each of the mated remapped search feature points.

In some implementations, computing a match score between the search tattoo image and the reference tattoo image includes: obtaining data indicating a first similarity score between the search tattoo image and reference tattoo image, the first similarity score computed based on a prior matching procedure; computing a second similarity score between the search tattoo image and the reference tattoo image based at least on comparing each of the search local descriptors and each of the remapped search local descriptors; and combining the first similarity score and the second similarity score to compute the match score between the search tattoo image and the reference tattoo image.

In some implementations, determining a mated region within the reference template includes computing a bounding region that contains mated feature points of the reference template.

In some implementations, the search feature points are distinctive feature points that are extracted from different scales of the search image, each search feature point comprising at least one of a coordinate location, an orientation or direction, and a scale associated with a particular scaled image.

In some implementations, the local descriptors of the search feature points or the reference feature points are one of: a SIFT descriptor, a LBP descriptor, an image patch, or a wavelet descriptor.

In some implementations, the plurality of transformation parameters includes at least a rotation parameter, a translation parameter, and a scale parameter.

In some implementations, the reference tattoo image is included within a set of best-matched reference tattoo images from a prior tattoo matching operation.

In some implementations, the reference template further includes a reference tattoo image. In such implementations, the method further includes: determining a mated region within the search template at least on respective locations of the search feature points of the group of mated feature point pairs within the search template; remapping, using the plurality of transformation parameters, the search feature points within the mated region of the search template onto the reference tattoo image to generate a set of remapped reference feature points; generating a respective reference local descriptor for each remapped reference feature point included within the set of remapped reference feature points; and comparing each of the remapped reference local descriptors to search local descriptors of search feature points that (i) are not included in the group of mated feature point pairs and (ii) are located within the mated region of the search template.

In some implementations, the match score between the search template and the reference template is computed based on: comparing each of the search local descriptors to the reference local descriptors of the corresponding remapped reference point, and comparing each of the reference local descriptors to each of the search local descriptors of the corresponding remapped search point.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, one innovative aspect described throughout this specification includes systems and techniques capable of performing a multi-stage tattoo matching operation to improve matching accuracy for small tattoo images, distorted tattoo images, low-quality tattoo images, among others. The multi-stage tattoo matching operation described throughout includes two matching stages that match a search tattoo image against a set of reference tattoo images using enhanced matching techniques.

As described throughout, "feature points" refer to points within a tattoo image (e.g., a search tattoo image or a reference tattoo image) that have distinctive attributes and/or features that enables their use in a tattoo matching operation. For example, feature points of a tattoo image may be used to identify locations within a tattoo image that correspond to distinctive feature of a tattoo included within the tattoo image. In other examples, feature points of a tattoo image may be used to identify distinctive regions of the tattoo image that may be used to identify other types of distinctive features (e.g., scars, marks) that are deeply embedded within the skin. In this regard, feature points within a particular tattoo image can be used to represent discriminative characteristics of the particular tattoo image or a tattoo included within the particular tattoo image that is then used to identify near-identical or similar tattoos and/or tattoo images within a database of stored reference tattoo images.

As described throughout, "local descriptors" refer to feature vectors that include local attributes of the feature points within a tattoo image. The local descriptors can include features such as color, edge, shape, gradient, direction, and texture, which are invariant to translation, rotation and scale. For example, the local descriptors can be scale invariant feature transform (SIFT) descriptors or speeded up robust feature (SURF) descriptors that are used for nearduplicate image detection and/or recognition. Other examples of local descriptors include an LBP descriptor, an image patch, or a wavelet descriptor.

In the first matching stage, the system can use scale invariant feature transform (SIFT) descriptors, or other similar types of descriptors, to identify a list of best-matched reference tattoo images from among the set of reference tattoo images. For example, the system initially computes respective similarity scores between the search tattoo image and each reference tattoo image based on a comparison of their local descriptors. The system then selects the reference templates with the highest similarity scores as the list of best-matched reference tattoo images.

In the second matching stage, the system uses enhanced tattoo matching techniques to differentiate between individual reference tattoo images included within the list of best-matched reference tattoo images. For simplicity, the techniques performed in the second stage are described in reference to a single reference tattoo image although the system performs the described techniques for each of the best-matched reference tattoo images.

The system initially identifies a mated region within a reference tattoo image based on the locations of mated reference feature points identified in the first matching stage. The system then identifies all reference feature points located within the mated region (e.g., mated reference feature points and non-mated reference feature points). The system then uses the locations and arrangement of the reference feature points within the mated region to compute one or more transformation parameters. The system then uses the transformation parameters to transform the search tattoo image. The system remaps the non-matched reference feature points within the mated region onto the transformed search tattoo image to generate a set of remapped search feature points. The system then computes local descriptors for each of the remapped search feature points, and then compares the feature descriptors for the remapped search feature points to the feature descriptors of the non-matched reference points in the mated region. The system finally computes a match score between search tattoo image and the reference tattoo image based on the comparison.

Another innovative aspect described throughout this specification includes systems and techniques capable of performing a multi-scale tattoo matching operation to improve matching accuracy for small tattoo images, distorted tattoo images, low-quality tattoo images, among others. The original tattoo search image or the reference image might be scaled and smoothed. In this scenario, the feature points matched might be on different scales in the first stage matching. The matched points from first stage might contain one or more scale parameters. The non-matched reference points in the mated regions might be at different scales.

In summary, the system uses the transformation and remapping techniques in the second matching stage to match that the non-matched reference feature points in the matched area identified in the first match stage actually represent non-mated feature points that there is no corresponding feature points in the search tattoo image. Using the multi-stage tattoo matching techniques, the system is therefore capable of improving the accuracy of a matching operation relative to traditional tattoo matching techniques.

The following detailed description of the implementations of the disclosure refers to the accompanying drawings. The same reference numbers in different drawings may identify the same or similar elements. In addition, the following detailed description provides exemplary implementations of the concepts described within the claims, and should not be read as to limit their scope.

System Overview

Figure 1:
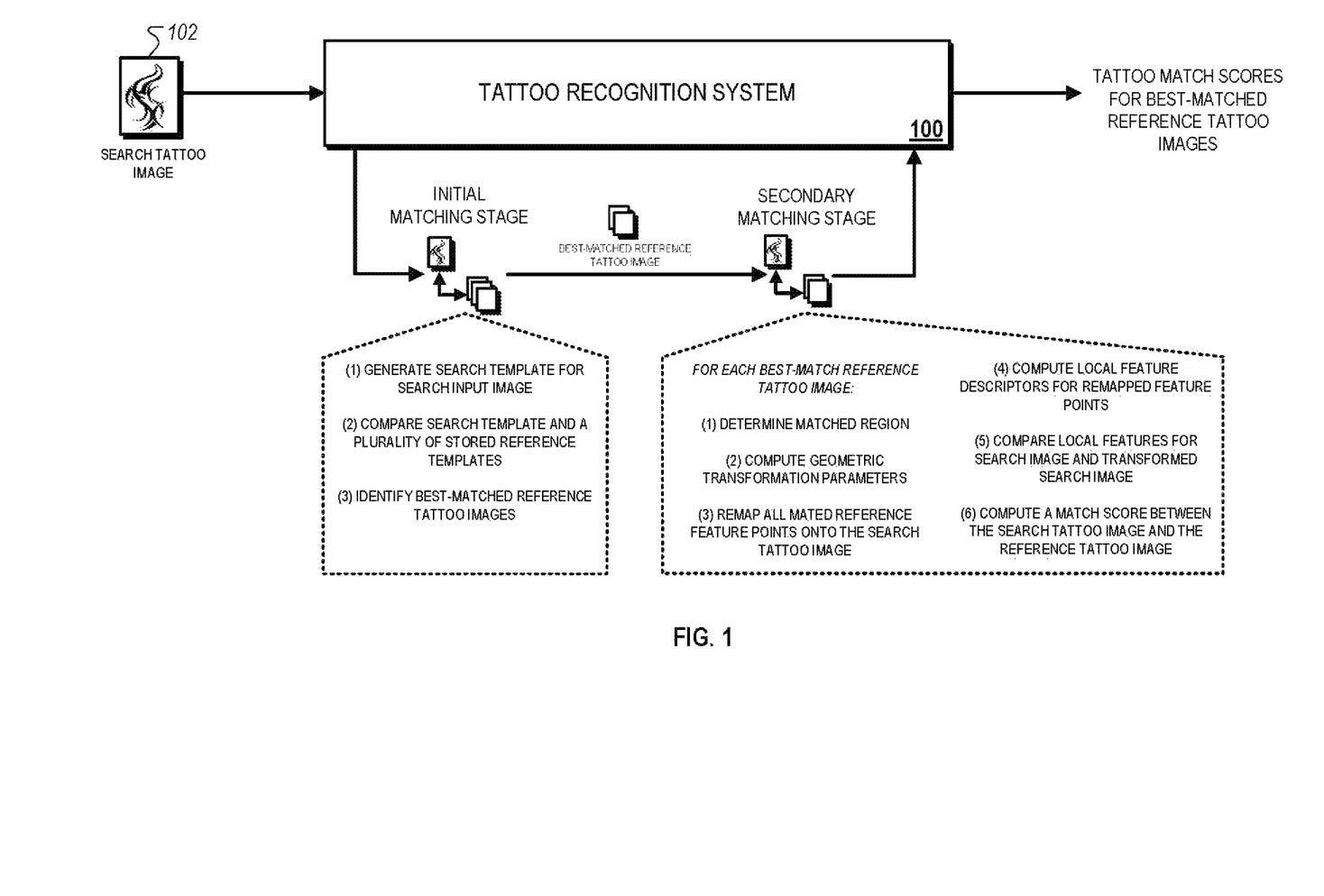
FIG. 1 illustrates a conceptual diagram of a multi-stage tattoo matching process.

FIG. 1 illustrates a conceptual diagram for an automatic tattoo segmentation and an overview of the multi-stage tattoo matching procedure performed by a tattoo recognition system 100. The system 100 initially receives a search tattoo image 102 that includes a tattoo. The system processes the search tattoo image 102, compares the search tattoo image 102 against a set of reference tattoo images stored within a database, and outputs match scores that reflect a respective likelihood that a tattoo included within a particular reference tattoo image corresponds to the tattoo within the search tattoo image 102.

The system 100 performs the matching procedure between the search tattoo image 102 and the set of reference tattoo images in two matching stages. In the first stage, the system 100 performs a feature extraction procedure to identify feature points within the tattoo image 102, and generate local descriptors for each of the identified feature points. The identified feature points and their corresponding feature descriptors are then included within a search template for the search tattoo image 102.

The system 100 then obtains a set of reference templates that are stored within a database associated with the system 100. The reference templates may be generated offline based on collected reference tattoo images. In some instances, the reference tattoo images associated with the reference templates may also be obtained from the database. The database may be a biometric database that is periodically updated and managed by a law enforcement agency and/or a government contractor that collects, processes, and stores biometric data for various individuals. Each of the obtained reference templates may include feature points previously extracted from a reference tattoo image and local descriptors for the feature points extracted from the reference tattoo image.

The system 100 then performs an initial matching operation between the search template and the obtained reference templates to identify the best-matched reference tattoo images for the search tattoo image. For instance, the system 100 may compare the local descriptors included within the search template to the local descriptors included within each of the obtained reference templates in order to identify a number of "mated" feature points between the search tattoo image and a particular reference tattoo image. As described in more detail below, a mated feature point pair includes a search feature point and its corresponding reference feature point, which are determined to be corresponding because their local descriptors are determined to satisfy a specified similarity threshold.

The system 100 computes a similarity score between the search tattoo image 102 and a particular reference tattoo image based on, for example, a number of reference feature points that are mated with a corresponding search feature point within the search tattoo image 102. In other examples, the similarity score may be computed based on other metrics such as a ratio of mated and unmated feature points within mated area of two compared tattoo images, among others.

The system 100 then identifies the best-match reference tattoo images based on the values of their similarity scores to the search tattoo image 102. For example, in some instances, the system 100 may sort the similarity score values in descending order and select a set of top N reference tattoo images that are determined to have the highest similarity score values as the best-matched reference tattoo images. Alternatively, in other instances, the system 100 may select only the reference tattoo images that have a computed similarity score that satisfies a specified threshold as the best-matched reference tattoo images.

The system 100 then proceeds with the secondary matching stage using the best-matched reference tattoo images identified in the initial matching stage. For simplicity, the descriptions below refer techniques performed in reference to a single reference tattoo image although the system performs the described techniques for each of the best-matched reference tattoo images.

The system 100 initially identifies a mated region within a reference tattoo image based on the locations of mated reference feature points identified in the initial matching stage. The system 100 then identifies all reference feature points located within the mated region (e.g., mated reference feature points and non-mated reference feature points). The system 100 then uses the locations and arrangement of the mated feature point pairs within the mated region to compute one or more transformation parameters. The system 100 then uses the transformation parameters to transform the search tattoo image. The system 100 remaps the non-matched reference feature points within the mated region onto the transformed search tattoo image to generate a set of remapped search feature points. The system 100 then computes local descriptors for each of the remapped search feature points, and then compares the feature descriptors for the remapped search feature points to the feature descriptors of the original search tattoo image. The system 100 finally computes a match score between search tattoo image and the reference tattoo image based on the comparison.

Multi-Stage Tattoo Matching Procedure

Figure 2:
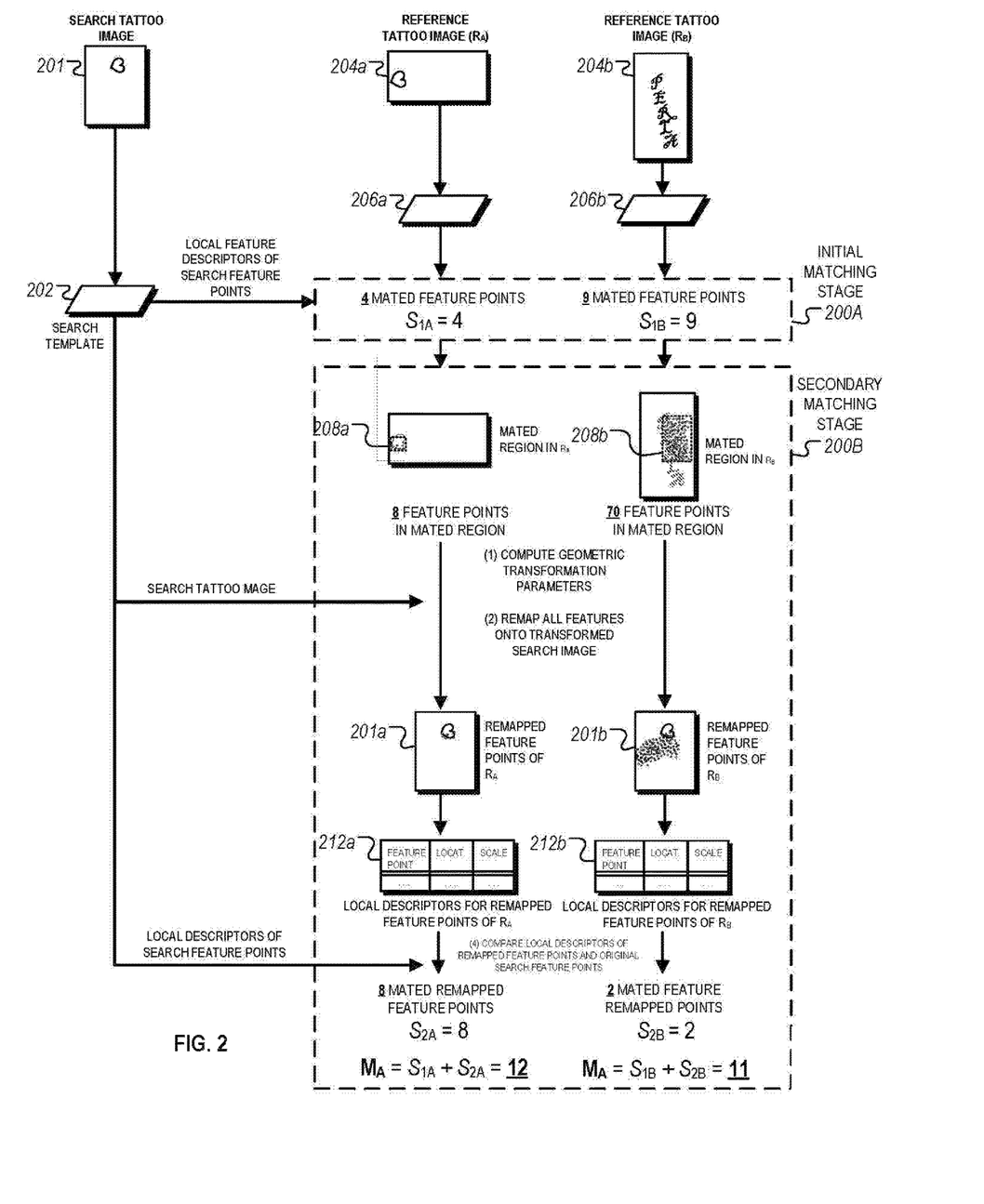
FIG. 2 illustrates a conceptual diagram for matching a search tattoo image against two exemplary reference tattoo images.

FIG. 2 illustrates a conceptual diagram for matching a search tattoo image 201 against two exemplary reference tattoo images 204a and 204b using the multi-stage tattoo matching procedure described throughout. In the example depicted, reference tattoo image 204a represents an image of the same tattoo within the search tattoo image 201 but captured in a different instance (e.g., a different photograph of the same tattoo). In comparison, the reference tattoo image 204b represents an image of a different tattoo than the tattoo included within the search tattoo image 201.

The system initially generates templates for each of the search tattoo image 201, and the reference tattoo images 204a and 204b. For instance, the system generates a search template 202 for the search tattoo image 201, and reference templates 206a and 206b for the reference tattoo images 204a and 204b, respectively. The system may generate the search template online, whereas the reference templates 206a and 206b may be pre-generated offline and obtained from a biometric database as described above.

The search template 202 is generated based on a feature extraction process described above in FIG. 1. For example, the system initially identifies feature points within the search tattoo image 201, and then generates local descriptors for each of the identified feature points. The identified feature points and their corresponding local descriptors are then included within the search template 202. The reference templates 206a and 206b include similar data such as reference feature points identified within the reference tattoo image 204a and 204b, respectively, and their corresponding local descriptors. In some implementations, the reference templates 206a and 206b include only the reference feature points and their local descriptors. In other implementations, the reference templates 206a and 206b may additionally include the actual reference template images 204a and 204b so that the system may process and adjust the reference tattoo images 204a and 204b during the secondary stage 200B described in more detail below.

In general, the example illustrated in FIG. 2 represents the advantage of performing the multi-stage tattoo operation relative to performing a single-stage tattoo operation (e.g., the initial matching stage 200A only). For instance, even though the reference tattoo image 204a includes the same tattoo as the tattoo within the search tattoo image 201, after completing the first tattoo matching stage, the similarity score for reference tattoo image 204b is determined to be higher than the similarity score for the reference tattoo image 204a. In this example, similarity score is computed based on the number of mated feature features within each reference tattoo image. Therefore, the similarity score $S_{1A}$ computed for the reference tattoo image 204a is equal to the value "4," whereas the similarity score SIB computed for the reference tattoo image 204b is equal to the value "9."

As described above, the difference in the number of mated feature points identified within the reference tattoo images 204a and 204b may be due to various reasons. One reason may be that, because the tattoo within the search tattoo image 201 is a small tattoo, the system identifies a small number of search feature points within the search tattoo image 201 (e.g., four feature points within the entire search tattoo image 201). Thus, the number of corresponding feature points to identify within the reference tattoo images 204a and 204b are also limited.

This may be further complicated due to the reference tattoo image 204a also having a small number of reference feature points because it also includes the same small tattoo. Another potential reason may be due to the search tattoo image 201 and/or the reference tattoo image 204a having distortions that either reduce the identification of feature points and/or superficially change the local descriptors for corresponding feature points between the images that prevent the detection of a mated feature point. In addition, as illustrated, although the tattoo in both the search tattoo image 201 and the reference tattoo image 204a have the same orientation, the location of the tattoo within each respective tattoo image varies, which may introduce other types of match detection errors.

To address the limitations described above, the system performs a secondary matching stage 200B to reduce the potential impact of tattoo size, image distortions, and/or orientation differences on tattoo match detection accuracy. As described above, the system initially identifies a mated region within each reference tattoo image that encompasses all of the mated references identified in the first matching stage 200A. In some implementations, the system identifies the mated region based on, for example, identifying the coordinate locations of each of the mated reference feature points (e.g., x-coordinate, y-coordinate), and selecting the minimal x and y coordinates and the maximal x and y coordinates, which represents the boundaries of the mated region.

In other implementations, instead of generating a rectangular bounding box to define the mated region, the system may also generate other shapes. For instance, the system may instead identify the outer-most mated feature points and generate a mated region with a boundary that connects the outer-most mated feature points.

In the example depicted, with respect to the reference tattoo image 204a, the system identifies a mated region 208a that encompasses the four mated reference feature points identified in the initial matching stage 200A. As shown, the system also identifies four other reference feature points that are included within the mated region 208a but were not identified in the initial matching stage 200A as mated reference feature points. With respect to the reference tattoo image 204b, the system identifies a mated region 208b that encompasses the nine mated reference feature points identified in the initial matching stage 200B. As shown, the system also identifies sixty-one other reference feature points that are included within the mated region 208b but were not identified in the initial matching stage 200A as mated reference feature points.

The system then computes one or more transformation parameters based on the mated point pairs included within each of the reference tattoo templates 206a and 206b (e.g., four and nine mated feature point pairs for the reference feature tattoo templates 206a and 206b, respectively). The transformation parameters identify a transformation between the mated feature points of particular reference tattoo image and the search tattoo image 201. For example, the transformation may be a simplest rigid transformation, an affine transformation, or any other transformation based on the difference between the corresponding feature points between the search tattoo image 201 and each of the reference tattoo images 204a and 204b.

The system then uses the transformation parameters to remap each of the non-matched reference feature points within the mated region of the reference tattoo templates 206a and 206b onto the search tattoo image 201. In some instances, this is accomplished by obtaining the search tattoo image 201 and generating multiple scales of the search tattoo image 201 using the transformation parameters. The transformation parameters are then used to identify, for each reference feature point, a remapped coordinate within the search tattoo image 201. Once this process has been completed for all non-matched reference feature points, the reference feature points are then remapped onto the search tattoo image (or a copy of the search tattoo image at a specified scale). These feature points will be referred to below as "remapped search feature points" for simplicity.

In the examples depicted, the eight non-matched reference feature points within the mated region 208a of the reference tattoo template 206a are remapped onto a search tattoo image 201a, which results in eight more matched remapped search feature points within the search tattoo image 201a to the non-matched reference features in the mated region. With respect to the other example, the seventy non-matched feature points within the mated region 208b of the reference tattoo image 204b are remapped onto a search tattoo image 201b, which results in only two more matched remapped search feature points within the search tattoo image 201b to the non-matched reference features in the mated region.

In some implementations, if the original reference tattoo images 204a and 204b are included within the reference templates 206b and 206b, respectively, or otherwise accessible by the system, the remapping process described above may be repeated for the reference tattoo images. The additional remapping techniques may be performed if the particular tattoo matching application is not time-sensitive and/or if higher tattoo match accuracy is desired. In such implementations, the system may additionally identify non-matched feature points in the mated region within the search tattoo image 201 or template 202 using the mated search feature points identified in the initial matching stage 200A, and then use the transformation parameters obtained earlier to remap the non-matched search feature points within the mated region of the search tattoo image 201 or template 202 onto the reference tattoo images 204a and 204b. In this regard, the system performs a remapping procedure on non-matched feature points in the mated region within the search tattoo template 201 or the search template 202, to the reference tattoo image 204a, and the reference tattoo image 204b.

Once the system remaps the non-matched reference feature points within the mated regions of the reference templates 206a and 206b onto the search tattoo images 201a and 202b, the system then computes local descriptors 212a and 212b for each of the remapped search feature points within the search tattoo images 201a and 201b, respectively. This technique may be performed in a similar manner to the computation of the local descriptors of the search feature points within the original search tattoo image 201 as described above. For instance, the local descriptors may include feature vectors that are descriptive for features extracted for each of the remapped search feature points within the search tattoo images 201a and 202b. For example, the local descriptors 212a and 212b may specify for each remapped search feature point, a location within the search tattoo image and an associated scale of the search tattoo image.

The system then compares the local descriptors for each of the remapped search feature points within the search tattoo images 201a and 201b to each of the local descriptors for each of the original non-matched reference feature points in the mated area within the reference tattoo templates 206a and 206b. This comparison is performed in a manner that is similar to the comparison performed in the initial matching stage 200A.

Moreover, this comparison is performed with the expectation that the remapped search feature points and the original non-matched reference feature points that are corresponding (or mated) should have similar feature descriptors, whereas the remapped search feature points and the original non-matched reference feature points that do not correspond should have different feature descriptors. Thus, while the results of the initial matching stage 200A are used to identify an initial mated region between the search tattoo image 201 and the reference tattoo images 204a and 204b, the arrangement and locations of the feature points within the mated region are independently verified using the remapping techniques described above in the secondary matching stage 200B.

In the example depicted, the system determines that each the remapped search feature points within the search tattoo image 201a (obtained based on the non-matched reference feature points within the mated region 208a of the reference tattoo image 204a) are mated eight remapped feature points out of eight non matched points in the mated area, indicating a high correspondence. In comparison, the system determines that only two of the remapped feature points out of seventy non-matched points within the search tattoo image 201b (obtained based on the non-matched reference feature points within the mated region 208b of the reference tattoo template 206b) are mated remapped feature points, indicating a low correspondence.

The system then computes a second similarity score between the search tattoo image 201 and each of the reference tattoo images 204a and 204b based on comparing the local descriptors of the remapped feature points within the search tattoo images 201a and 201b, and the local descriptors of the feature points within the search tattoo image 201. In the example shown, the second similarity score is determined based on the number of mated remapped feature points within the search tattoo images 201a and 201b. Therefore, the similarity score $S_{2A}$ computed for the reference tattoo image 204a is equal to the value "8,"

whereas the similarity score $S_{2B}$ computed for the reference tattoo image 204b is equal to the value "2." In other implementations, the second similarity score can also be computed based on, for example, a ratio of mated and unmated remapped feature points and/or one or more determined quality metrics of the mated remapped feature points.

The system then finally computes match scores between the search tattoo image 201 and each of the reference tattoo images 204a and 204b. In the example illustrated, the match score is determined based on combining the first similarity score that is computed in the initial matching stage 200A and the second similarity score that is computed in the secondary matching stage 200B. The combination can be the function of the first and the second similarity scores. In the example illustrated, the function is an addition of the first and second similarity scores, the match score MA computed for the reference tattoo image 204a is equal to the value "12," whereas the match score MB computed for the reference tattoo image 204b is equal to the value "11." In this example, after performing the secondary match stage 200B, the system determines that the reference tattoo image 204a is more likely to represent a near-identical or similar tattoo image of the search tattoo image 201 than the reference tattoo image 204b because it is determined to have a higher match score.

The difference in these two results in the figure demonstrates how the transformation and remapping techniques performed in the secondary matching stage 200B can be used to reduce potential false positive tattoo and improve the true positive tattoo match results using a technique that only compares the local descriptors of search feature points and reference feature points.

Figure 3:
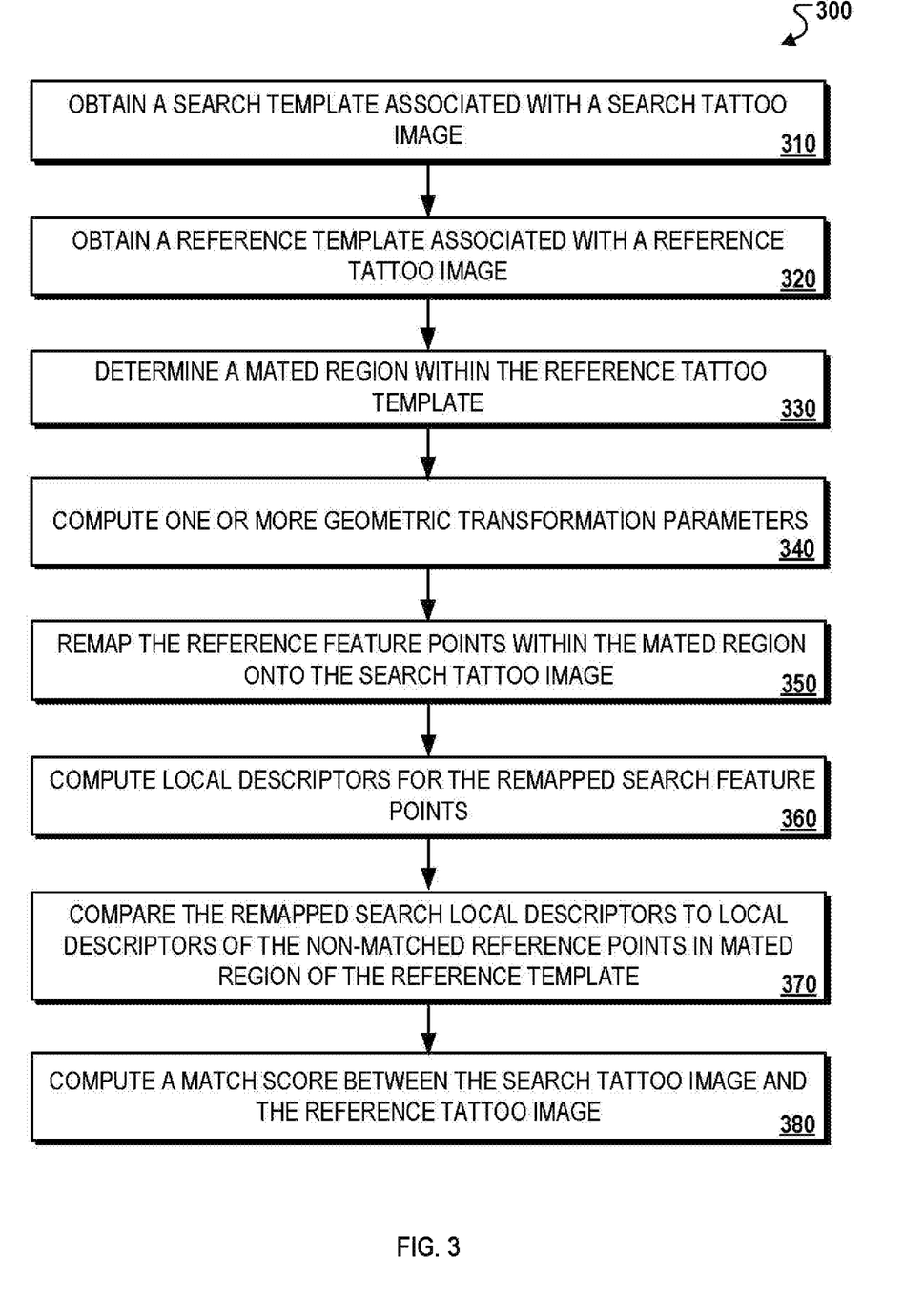
FIG. 3 illustrates a flowchart of an exemplary multi-stage tattoo matching process.

FIG. 3 illustrates a flowchart of an exemplary multi-stage tattoo matching process 300. For convenience, the process 300 will be described as being performed by a system of one or more computers. For example, a tattoo recognition system, e.g., the tattoo recognition system 100 of FIG. 1, appropriately programmed in accordance with this specification, can perform the process 200.

Briefly, the process 300 can include obtaining a search template associated with a search tattoo image (310), obtaining a reference template associated with a reference tattoo image (320), determining a mated region within the reference tattoo image (330), computing one or more transformation parameters (340), remapping the reference feature points within the mated region onto the search tattoo image (350), generating local descriptors for the remapped search feature points (360), comparing the remapped search local descriptors to local descriptors of the search tattoo image (370), and computing a match score between the search tattoo image and the reference tattoo image (380).

In more detail, the system obtains a search template associated with a search tattoo image (310). For instance, the system 100 obtains the search template 202 associated with the search tattoo image 201. As described above, the search template 201 can include a list of search feature points within the search tattoo image 201, and local descriptors for each of the search feature points within the search tattoo image 201. In some instances, the search template 202 can also include additional information associated with the search tattoo image 201 (e.g., tattoo characteristics/attributes, etc.).

The system then obtains a reference template associated with a reference tattoo image (320). For instance, the system 100 obtains the reference template 206a associated with the reference tattoo image 204a. As described above, the reference template 206a can include a list of reference feature points within the reference tattoo image 204a, and local descriptors for each of the reference feature points. In addition, the reference template 206a can also include a group of mated reference feature points that includes one or more reference feature points that were determined in the initial matching stage 200A to correspond to a particular search feature point within the search tattoo image 201. In the example illustrated in FIG. 2, the group of mated reference feature points includes four reference feature points.

The system determines a mated region within the reference tattoo template (330). For instance, the system 100 may determine the mated region 208a within the reference tattoo template 206a based on the respective locations of reference feature points within the reference tattoo template 206a of the reference feature points included in the group of mated reference feature points (e.g., the mated reference feature points). In the example illustrated in FIG. 2, the boundaries of the mated region 208a is determined based on the minimal and maximal x and y coordinates of a particular mated reference feature point. As described above, in other implementations, other techniques may be used to determine the boundaries of the mated region.

The system computes a plurality of transformation parameters (340). For instance, the system 100 computes a plurality of transformation parameters based at least on respective locations of mated point pairs that are located within the mated region 208a of the reference tattoo image 204a. As described above, in some instances, the transformation parameters may also be computed based on the arrangement of each of the reference feature points within the mated region 208a. The transformation can be a simplest rigid transformation, an affine transformation, or any other transformation based on errors between the corresponding feature points between the search tattoo image 201 and the reference tattoo image 204a. Examples of transformation parameters include a rotation parameter, a translation parameter, and a scale parameter.

The system remaps the non-matched reference feature points within the mated region onto the transformed search tattoo image (350). For instance, the system 100 remaps the non-matched reference feature points within the mated region 208a of the reference tattoo image 204a onto the search tattoo image 201a to generate a set of remapped search feature points using the one or more computed geometric transformation parameters. In the example illustrated in FIG. 2, eight non-matched reference feature points that are identified within the mated region 208a are remapped onto the search tattoo image 201a.

The system generates local descriptors for the remapped search feature points (360). For instance, the system 100 generates a local descriptor for each feature point included within the set of remapped search feature points of transformed search image. As described above, the local descriptors 212a can specify, for example, a location of the remapped feature point within the search tattoo image 201a, and an associated scale.

The system compares the remapped search local descriptors to local descriptors of non-matched reference feature points in the mated area of the reference templates (370). For instance, the system 100 compares each of the local descriptors for the non-matched reference feature points in the mated area within the reference templates 206a and 206b and each of the local descriptors for the remapped search feature points within the search tattoo image 201a. This comparison is performed with the expectation a mated pair of a feature point and its corresponding remapped feature point should have similar local descriptors in the mated area, whereas a non-corresponding pair of a feature point and a remapped feature point should have dissimilar local descriptors (or at least a similarity that is below a specified threshold) in the mated area.

As described above, the system 100 uses the comparison results to determine a number of mated remapped feature points (e.g., mated remapped feature points that have a corresponding search feature point within the search tattoo image 201). In the example depicted in FIG. 2, the system 100 determines that all eight of the remapped feature points within the search tattoo image 201a are mated remapped feature points. The comparison results are also used to compute a second similarity score between the search tattoo image 201 and the reference tattoo image 204a (the first similarity score is computed within the initial matching stage 200A). As described above, in some implementations, the second similarity score is equal the number of mated remapped feature points. For example, the second similarity score $S_{2A}$ for the reference tattoo image 204a is equal to the value "8" because there are eight mated remapped feature points within the search tattoo image 201a. In other implementations, the similarity score could be a function of the number of matched points in relation to the number of non-matched points in the mated area.

The system finally computes a match score between the search tattoo image and the reference tattoo image (380). For instance, the system computes a match score MA between the search tattoo image 201 and the reference tattoo image 204a based at least on comparing each of the search local descriptors and each of the remapped search local descriptors. In some implementations, the match score is computed based on combining a first similarity score that is computed in the initial matching stage 200A and a second similarity score that is computed in the secondary matching stage 200B. In the example illustrated in FIG. 2, a first similarity score $S_{1A}$ for the reference tattoo image 204a is equal to the value "4," and the second similarity score $S_{2A}$ is equal to the value "8," so the match score MA is equal to the value "12." In other implementations, other combination techniques can also be used.

Figure 4:
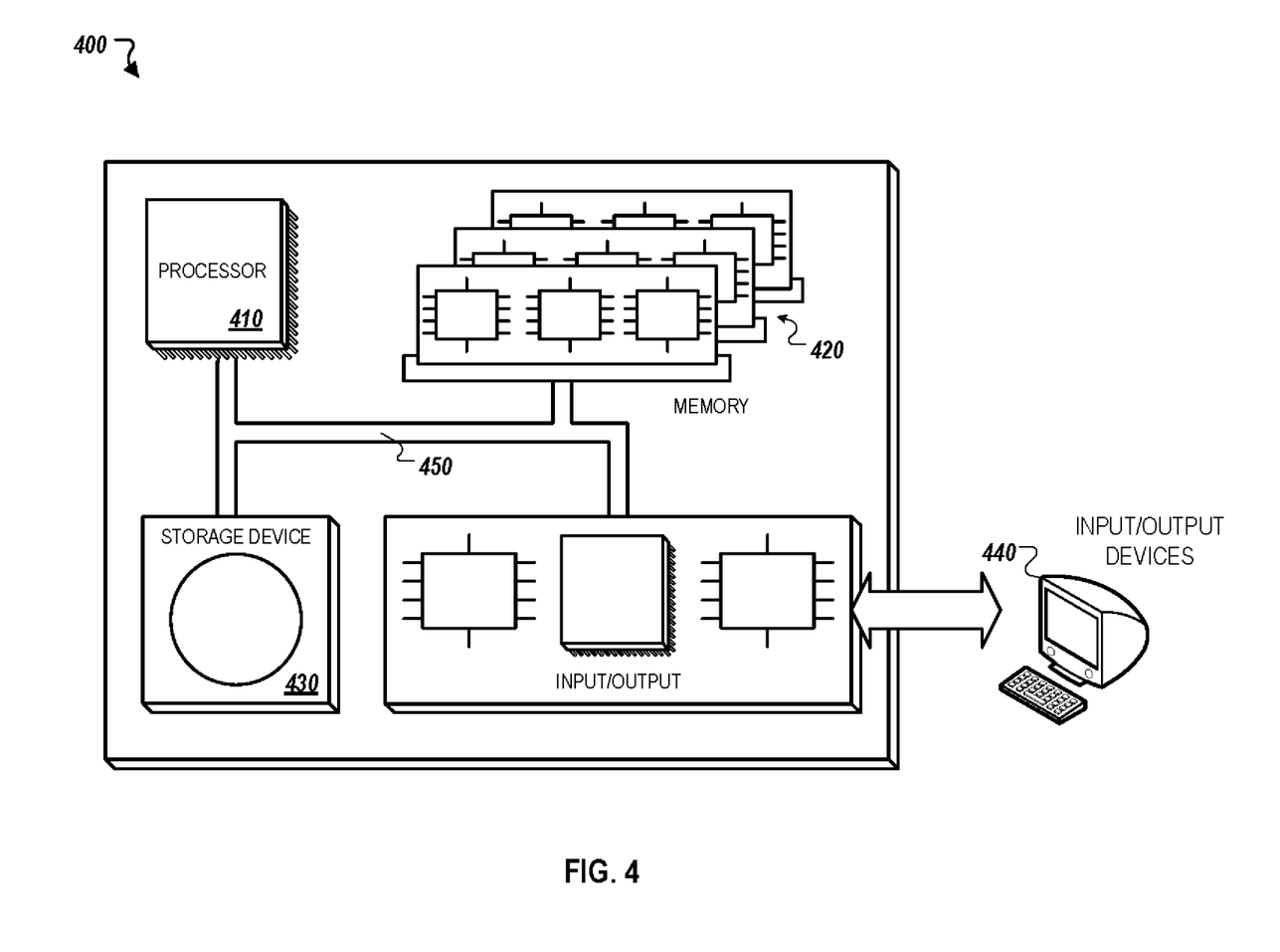
FIG. 4 is a block diagram of computing devices on which the processes described herein, or portions thereof, may be implemented.

FIG. 4 is a schematic diagram of a computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 400) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 440. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    obtaining data indicating (i) a mated region between a search tattoo image and a reference tattoo image, and (ii) one or more transformation parameters based on a correspondence between search feature points and reference feature points in the mated region;
    remapping, based on the one or more transformation parameters, reference feature points of the reference tattoo image onto the search tattoo image to generate a set of remapped search feature points;
    generating a remapped search local descriptor for each remapped search feature point included within the set of remapped search feature points;
    identifying a subset of reference feature points that are included within the mated region of the reference tattoo image;
    computing, based on reference local descriptors for reference feature points included in the subset of reference feature points and the remapped search local descriptors for the set of remapped search feature points, a match score between the search tattoo image and the reference tattoo image; and
    providing the match score for output.

2. The method of claim 1, wherein computing the match score between the search tattoo image and the reference tattoo image comprises:
    comparing the remapped search local descriptors and the reference local descriptors for reference feature points included in the subset of reference feature points; and
    identifying, based on the comparison of the remapped search local descriptors and the reference local descriptors for reference feature points included in the subset of reference feature points, remapped search feature points that are mated with at least one reference feature point included in the subset of reference feature points.

3. The method of claim 1, wherein the match score is computed based on a number of identified remapped search feature points that are mated with at least one reference feature point included in the subset of reference feature points.

4. The method of claim 1, wherein the mated region represents a bounding region of the reference tattoo image that contains reference feature points that are identified as being mated to search feature points of the search tattoo image.

5. The method of claim 1, wherein the reference local descriptors and the search local descriptors comprise one of:
    a SIFT descriptor;
    a LBP descriptor;
    an image patch; or
    a wavelet descriptor.

6. The method of claim 1, wherein the one or more transformation parameters comprises either a rotation parameter, a translation parameter, or a scale parameter.

7. The method of claim 1, wherein the reference tattoo image comprises a tattoo image that (i) is selected from among a library of reference tattoo images that were previously compared to the search tattoo image and (ii) is identified in a prior matching operation as a best-matched reference tattoo image.

8. A system comprising:
one or more computers; and
one or more storage devices storing instructions that, when executed by the one or more computers, cause the one or more computers to perform operations comprising:
obtaining data indicating (i) a mated region between a search tattoo image and a reference tattoo image, and (ii) one or more transformation parameters based on a correspondence between search feature points and reference feature points in the mated region;
remapping, based on the one or more transformation parameters, reference feature points of the reference tattoo image onto the search tattoo image to generate a set of remapped search feature points;
generating a remapped search local descriptor for each remapped search feature point included within the set of remapped search feature points;
identifying a subset of reference feature points that are included within the mated region of the reference tattoo image;
computing, based on reference local descriptors for reference feature points included in the subset of reference feature points and the remapped search local descriptors for the set of remapped search feature points, a match score between the search tattoo image and the reference tattoo image; and
providing the match score for output.

9. The system of claim 8, wherein computing the match score between the search tattoo image and the reference tattoo image comprises:
comparing the remapped search local descriptors and the reference local descriptors for reference feature points included in the subset of reference feature points; and
identifying, based on the comparison of the remapped search local descriptors and the reference local descriptors for reference feature points included in the subset of reference feature points, remapped search feature points that are mated with at least one reference feature point included in the subset of reference feature points.

10. The system of claim 8, wherein the match score is computed based on a number of identified remapped search feature points that are mated with at least one reference feature point included in the subset of reference feature points.

11. The system of claim 8, wherein the mated region represents a bounding region of the reference tattoo image that contains reference feature points that are identified as being mated to search feature points of the search tattoo image.

12. The system of claim 8, wherein the reference local descriptors and the search local descriptors comprise one of:
a SIFT descriptor;
a LBP descriptor;
an image patch; or
a wavelet descriptor.

13. The system of claim 8, wherein the one or more transformation parameters comprises either a rotation parameter, a translation parameter, or a scale parameter.

14. The system of claim 8, wherein the reference tattoo image comprises a tattoo image that (i) is selected from among a library of reference tattoo images that were previously compared to the search tattoo image and (ii) is identified in a prior matching operation as a best-matched reference tattoo image.

15. A non-transitory computer-readable storage device encoded with computer program instructions that, when executed by one or more computers, cause the one or more computers to perform operations comprising:
obtaining data indicating (i) a mated region between a search tattoo image and a reference tattoo image, and (ii) one or more transformation parameters based on a correspondence between search feature points and reference feature points in the mated region;
remapping, based on the one or more transformation parameters, reference feature points of the reference tattoo image onto the search tattoo image to generate a set of remapped search feature points;
generating a remapped search local descriptor for each remapped search feature point included within the set of remapped search feature points;
identifying a subset of reference feature points that are included within the mated region of the reference tattoo image;
computing, based on reference local descriptors for reference feature points included in the subset of reference feature points and the remapped search local descriptors for the set of remapped search feature points, a match score between the search tattoo image and the reference tattoo image; and
providing the match score for output.

16. The device of claim 15, wherein computing the match score between the search tattoo image and the reference tattoo image comprises:
comparing the remapped search local descriptors and the reference local descriptors for reference feature points included in the subset of reference feature points; and
identifying, based on the comparison of the remapped search local descriptors and the reference local descriptors for reference feature points included in the subset of reference feature points, remapped search feature points that are mated with at least one reference feature point included in the subset of reference feature points.

17. The device of claim 15, wherein the match score is computed based on a number of identified remapped search feature points that are mated with at least one reference feature point included in the subset of reference feature points.

18. The device of claim 15, wherein the mated region represents a bounding region of the reference tattoo image that contains reference feature points that are identified as being mated to search feature points of the search tattoo image.

19. The device of claim 15, wherein the reference local descriptors and the search local descriptors comprise one of:
a SIFT descriptor;
a LBP descriptor;
an image patch; or
a wavelet descriptor.

20. The device of claim 15, wherein the one or more transformation parameters comprises either a rotation parameter, a translation parameter, or a scale parameter.

* * * * *